June 22, 1954   E. E. WILSON   2,681,974
WATER TREATMENT AND HEATING
Filed Sept. 28, 1951   2 Sheets-Sheet 1
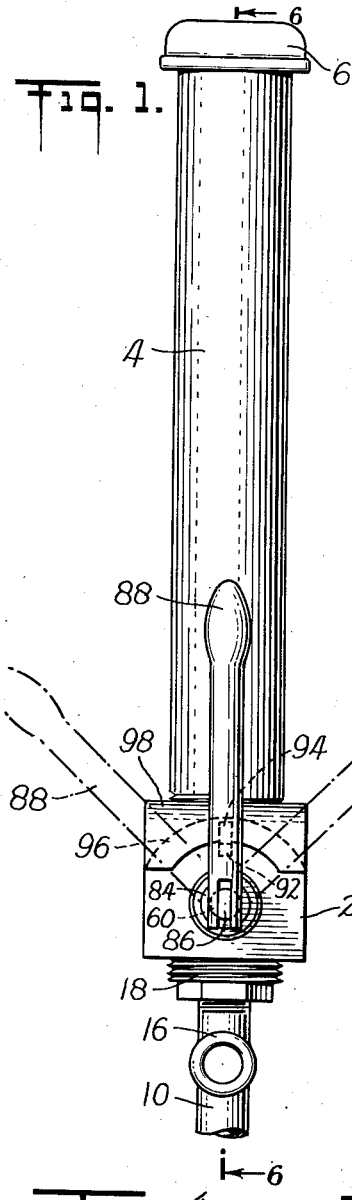
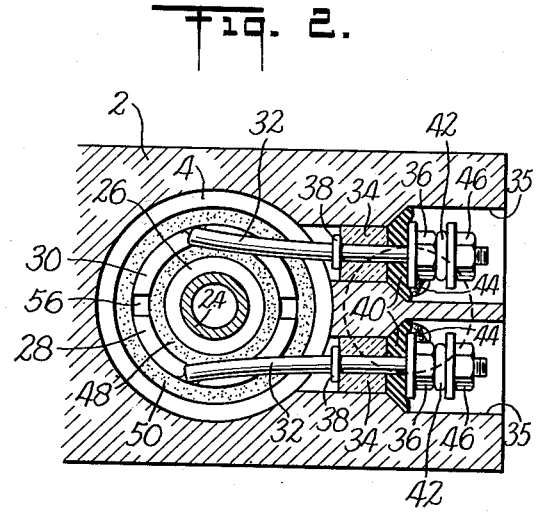
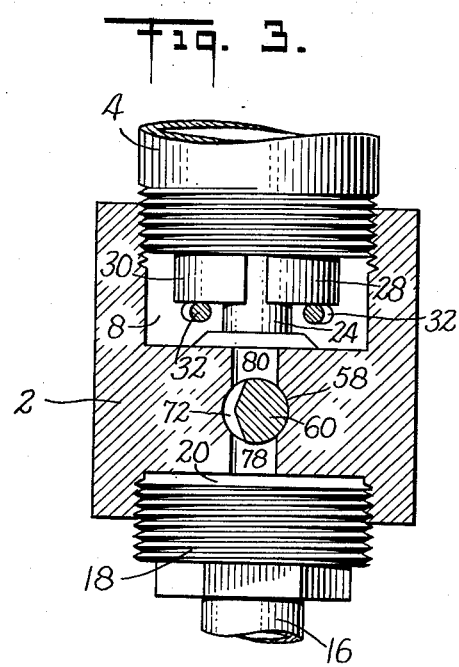
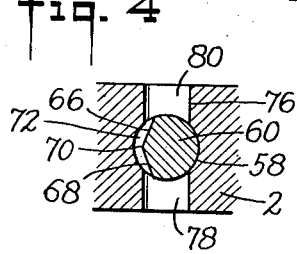
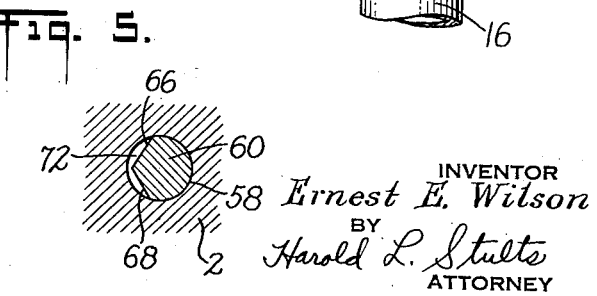
INVENTOR
Ernest E. Wilson
BY Harold L. Stults
ATTORNEY June 22, 1954  E. E. WILSON  2,681,974
WATER TREATMENT AND HEATING
Filed Sept. 28, 1951  2 Sheets-Sheet 2
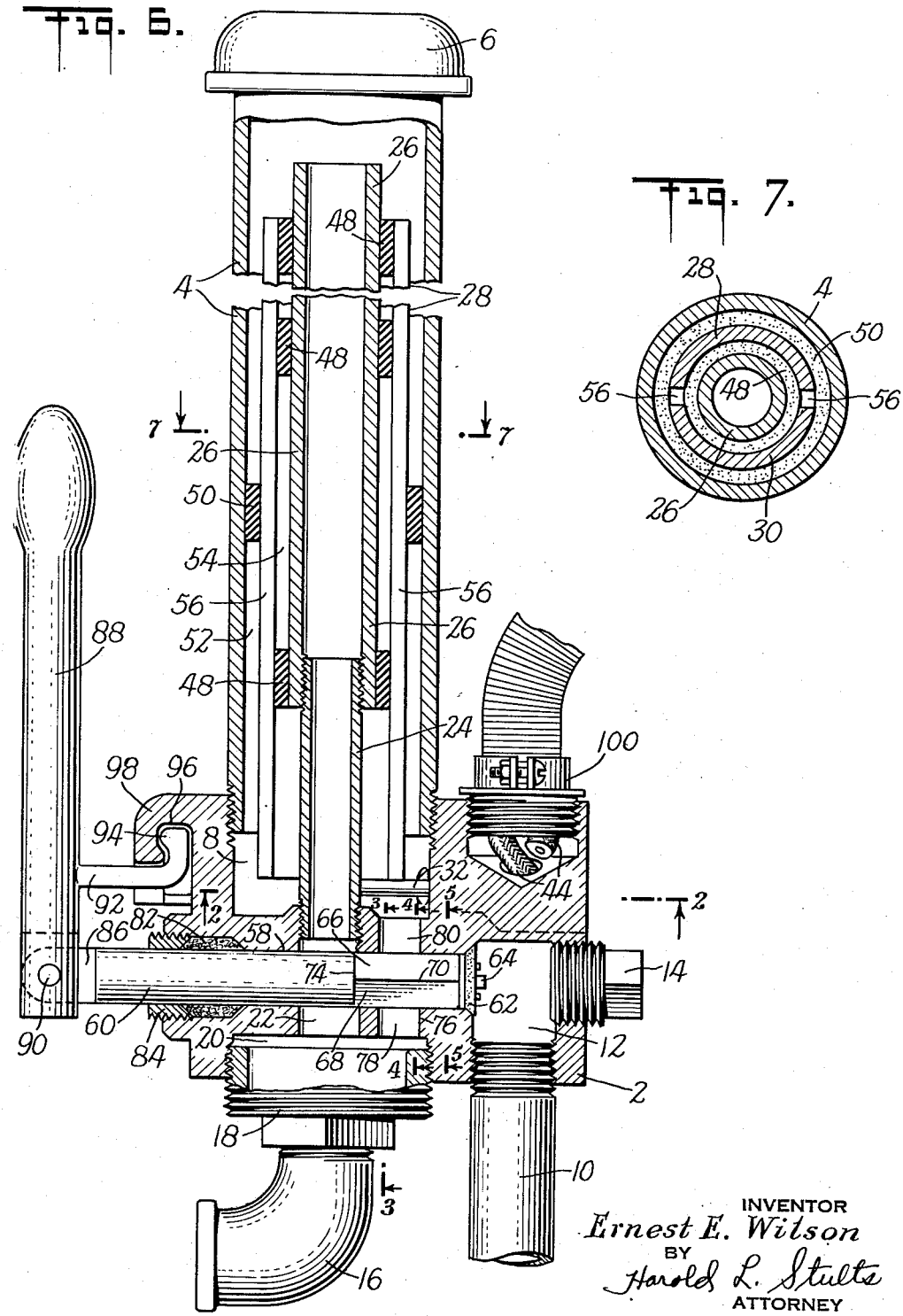
INVENTOR
*Ernest E. Wilson*
BY
*Harold L. Stults*
ATTORNEY Patented June 22, 1954

2,681,974

UNITED STATES PATENT OFFICE 2,681,974

WATER TREATMENT AND HEATING

Ernest E. Wilson, Goldthwaite, Tex.

Application September 28, 1951, Serial No. 248,673

7 Claims. (Cl. 219—40)

This invention relates to the electrical treating of water for the heating and sterilizing and the purifying thereof, and more in particular to electric water heaters which are adapted to operate to treat a continuously flowing stream of water.

Electric water heaters have been proposed in the past to be connected to a supply of cold water and to heat a stream of the water as it is discharged from a faucet or through a discharge pipe. Some such water heaters have been built and used but they have been generally unsatisfactory for one reason or another. Some of these have utilized metallic resistors to provide the heating, and others have utilized the water to produce the resistance in the electric circuit between the electrodes. Each of these types of prior devices have had one or more very serious faults which rendered them troublesome or even dangerous in use; or, in some instances, the devices have worked properly for only a short period of time and thereafter were completely useless.

It is an object of this invention to provide an electric water treating device which will avoid the difficulties encountered with similar devices in the past, and which will give thoroughly satisfactory results for all of the various conditions of operation which are encountered. It is a further object to provide such devices which are simple in construction and operation and which are inexpensive to manufacture and to operate and maintain. It is a still further object to provide for the above in a manner to give absolute safety under all conditions of normal operation and even under extreme conditions where the devices might be subjected to extreme abuse and where us of other similar devices would be hazardous.

In the drawings:

Figure 1 is a front elevation of one embodiment of the invention;

Figures 2, 3, 4 and 5 are sectional views on the lines 2—2, 3—3, 4—4 and 5—5, respectively, of Figure 6;

Figure 6 is a vertical section on the line 6—6 of Figure 1 but showing certain parts in full lines; and, Figure 7 is a sectional view on the line 7—7 of Figure 6.

Referring to Figure 1 of the drawings, the illustrative water heater or treating device has a cast metal base block 2 and an upstanding cylindrical shell or casing 4 closed at the top by a cap 6 (see also Fig. 6). The casing 4 is rigidly supported on the base block, being threadably received at its lower end in a recess or chamber 8.

The cold water supply pipe 10 is threaded into the bottom of the base block so that incoming cold water is delivered to an inlet chamber 12 which is closed at the right by a screw plug 14. The water is discharged from the device through a discharge coupling 16 which is threadably received in the bottom of a fitting 18; fitting 18 is in turn threadably received in a recess in the bottom of the base block and forms with the recess a mixing chamber 20.

The chamber 20 is open to a vertical passageway or bore 22 which extends upwardly and is open to a pipe 24 threadably received in the upper end of the bore. The top of pipe 24 has threaded thereon a pipe 26 which extends concentrically upwardly within casing 4 to near the top thereof. Positioned within the annular space between the outer surface of pipe 26 and the inner surface of shell 4 are two semi-cylindrical electrodes 28 and 30 (see also Fig. 7) which are formed by cutting a pipe axially along a diameter thereof.

These electrodes are spaced from pipe 26 and shell 4 by a plurality of ceramic collars 48 and 50, respectively, which are alternately spaced along the inner and outer surfaces of the electrodes. Each electrode is supported at the bottom by a stainless steel stud bolt 32 which is welded to its electrode (see Fig. 2) and is rigidly mounted at its right hand end in a recess 35. The bolt is electrically insulated from the base block by an insulating bushing 34 in a recess 35, and a nut 36 threaded on to the bolt clamps the bushing 34 against a collar 38 integral with the bolt; and, also expands a rigid rubber washer 40 so as to provide a water-tight clamping seal in the recess 35. A connecting terminal 42 on an electric supply wire 44 (see Fig. 6) is clamped to the projecting end of each bolt by a nut 46 (Fig. 2) thus to provide electrical connections through the bolts to each of the electrodes.

As indicated above, the electrodes are spaced from pipe 26 by a series of ceramic washers or collars 48 and are spaced from shell 4 by a series of similar collars 50. The collars 48 and 50 are positioned alternately (as shown in Fig. 6) with the bottom collar 50 positioned substantially intermediate the lower two collars 48 and there being corresponding spacing between the other collars.

Thus chamber 8 is open to the lower end of a cylindrical chamber 52 which is between the inner wall of shell 4 and the outer wall of electrodes 28 and 30; and, the lower portion of this chamber is blocked by the lower collar 50. There is a similar but smaller cylindrical chamber 54 between the outer surface of pipe 26 and the inner surfaces of electrodes 28 and 30; and, chambers 52 and 54 are interconnected by the slots formed by the spacing of the edges of the electrodes. Hence, the lower portion of chamber 52 is connected to the lower portion of chamber 54 by a pair of slots 56 between the top of the lower collar 48 and the bottom of the lower collar 50; and, a water flow path is therefore provided upwardly through the bottom of chamber 52 and thence through slots 56 and again upwardly through the lower portion of chamber 54. This lower portion of chamber 54 is connected at the top through a similar portion of the pair of slots 56 to an adjacent portion of chamber 52 to which the flowing water is diverted by the next insulating collar 48. The flow path continues upwardly and alternately through portions of the chambers 52 and 54; and, at the top, the entire shell is open so that the flow is downwardly through the pipe 26.

Base block 2 has a transverse valve bore 58 in which is snugly received a valve plunger 60. Plunger 60 carries at its right hand end a shutoff valve 62 which is formed by a valve washer clamped to the end of the plunger by a screw 64; and, the valve 62 is adapted to rest on a seat, as shown, or to be moved to the right into chamber 12 so as to permit a flow of water through the valve opening formed by the right hand end of bore 58. The main portion of plunger 60 is circular in cross section but the right hand end is cut away to form a somewhat arcuate passageway 72 (Fig. 5) defined by two flat surfaces 66 and 68 which meet at an edge 70. Thus, passageway 72 permits water to flow to the left (Fig. 6). This passageway is of increased diameter toward the left by virtue of surfaces 66 and 68 being in planes which slant toward the axis of the plunger; that is, the plunger is cut away to a greater extent toward the left in Fig. 6, and the surfaces terminate at a shoulder 74 at which the plunger is circular in cross section. The cross sections of the plunger and passageway 72 on the line 3—3 of Fig. 6 are shown in Fig. 3 and other sections are shown in Figs. 4 and 5.

Bore 58 is intersected by a vertical bore 76 (Fig. 3) which forms a downward passageway or bottom chamber 78 and an upward passageway or top chamber 80. Chamber 78 is open at the bottom to chamber 20 and chamber 80 is open at the top to chamber 8. Hence, the valve plunger may be positioned to provide for the flow of water from chamber 12 (Fig. 6) to the left through passageway 72, and then the stream of water is divided with one portion flowing upwardly through chamber 80 to chamber 8 and with the other portion flowing downwardly through chamber 78 to chamber 20. Surrounding plunger 60 in the zone where it projects from bore 58 is a watertight packing 82 which is of synthetic rubber composition and which is compressed by a ring nut 84 threaded into the base block. This provides a water-tight seal around the plunger and it also provides sufficient friction on the plunger to normally hold the plunger in any position to which it is moved. Thus, when the plunger is moved to the right so as to open the valve the plunger remains in the open position, and when the plunger is moved to the left to close the valve the valve remains closed. The water pressure in the chamber 12 also aids in holding the valve closed.

The left hand end of plunger 60 has an extension 86 which extends into a slot in the bifurcated lower end of an operating handle 88, and a pivot pin 90 provides a pivot connection between the plunger and the handle. Handle 88 has welded to it a pivot arm 92 which is formed by a horizontal portion and an end hook portion 94. The hook portion 94 is positioned in an arcuate slot 96 which is formed in a bracket 98 on the side of the base block. The arcuate slot 96 has the cross-section shown in Fig. 6, and (see Fig. 1) it has its center concentric with the center of plunger 60 so that the operating handle may be swung from the horizontal position shown in full lines about the axis of the plunger, with the result that the plunger is thereby rotated in its bore. Bracket 98 has integral lugs which limit the right and left swinging movement of handle 88 to the extreme positions shown in broken lines.

Referring again to Figure 6, with the plunger 60 positioned as shown, the valve is opened by swinging the upper end of handle 88 outwardly to the left so that the handle rotates about the pivot formed by the end of hook portion 94 nesting in slot 96, and this slides the plunger 60 axially to the right so as to unseat the valve 62 and permit the water to flow. There is sufficient lost motion in the sizes and shapes of the parts to permit this operation but yet the movement of the plunger is controlled and adjusted accurately to the position desired.

Passageway 72 is of smaller cross-section adjacent its right hand end so that there is a relatively small water flow when the valve 62 is first unseated by the initial movement of the plunger. However, as the plunger is moved farther to the right the cutaway portion of the plunger is moved farther into chamber 12 and the cross-section of the passageway 72 at the edge of chamber 12 is increased because of the deeper cuts in the plunger towards the left. This results in the further movement of the plunger, causing an increase in the rate of flow from the chamber through the valve opening.

It has been indicated above that when the plunger is positioned as shown, there are substantially even streams of water directed upwardly and downwardly respectively through chambers 80 and 78. The water which flows upwardly enters chamber 8 and flows along the path described above formed by cylindrical chambers 52 and 54 and slots 56 to the top of shell 4; and, it then flows downwardly through pipe 26 and thence through pipe 24 and bore 22 past the sides of the plunger to chamber 20.

When passing upwardly through chambers 52 and 54 the water is subjected to a heating, sterilizing and purifying effect resulting from passing electric current through it because of electrodes 28 and 30 being continuously connected through bolts 32 to a source of electric power through the electric supply wires 44. In this embodiment wires 44 form with the ground a three-wire, 220-volt A. C. supply circuit with the ground connection being provided through the water supply pipe 10 and also through a ground connection 100 which connects the base block 2 to a grounded circuit. Shell 4 and pipes 24 and 26 are electrically connected to the base block through their threaded mountings and therefore are at ground potential, and electrodes 28 and 30 are at 220 volts potential with respect to each other but each electrode is at only 110 volts from ground potential.

Thus, referring to Figure 7, the water passing upwardly is subjected to a substantially constant potential, there being a voltage drop of 110 volts across the thin streams of water flowing upwardly in the cylindrical passageways. It has been found that this imparts rapid heating to the water and it also sterilizes and purifies the water. The electrical connections to the electrodes are maintained at all times so that the heating starts immediately upon the entry of the water into the bottom of the heating unit. When the water reaches the top of shell 4 it is hot and it flows downwardly through pipes 26 and 24 and passageway 22 to chamber 20. The stream of the cold water flowing downwardly through chamber 78 also enters chamber 20 and is mixed with hot water, and the water is at a uniform temperature as it is discharged through coupling 16. Under some circumstances the water is utilized directly from coupling 16, or it may be directed to a basin or tank, not shown. The diameter of bore 22 is such that the water is readily discharged around the plunger at the sides thereof, and the entire construction and arrangement is such that a thorough mixing of the hot and treated water and the untreated cold water takes place in chamber 20.

It has been indicated above that the plunger 60 may be turned or rotated between predetermined limits by swinging handle 88 between the broken line positions of Figure 1. This turning of the plunger changes the proportions of water passed upwardly through the heating unit and directly to the chamber 20. As has been pointed out, when the handle is in the full line position, substantially equal streams of water are passed upwardly and downwardly. But, as the handle is swung to the left in Figure 1 so that the plunger is turned clockwise in Figure 3, the amount of water discharged into the chamber 78 is decreased while the amount discharged into chamber 80 is increased.

Thus the swinging of the handle in this way, causes an increase in the amount of water which flows upwardly through the heating treating unit and causes a corresponding decrease in the flow of the cold or untreated water directly to chamber 20. A turning movement of approximately 45° diverts the entire stream of water upwardly through the heating or treating unit so that all of the water is heated before it flows to the chamber 20. Conversely, the swinging of handle 88 to the right in Figure 1 turns the plunger counterclockwise in Figure 3 and diverts more of the water directly to chamber 20 and less of the water upwardly through the heating or treating unit; and in the extreme position all of the water is diverted downwardly. It has been indicated above that plunger 60 is retained in any predetermined or adjusted position by the friction of the packing 82 on the plunger and this is effective not only to prevent creeping of the valve open or closed, but also to prevent the turning of the plunger within its bore. Thus, after the electrical and water connections having been made, if the operator desires to obtain water he merely pulls outwardly upon the top of the handle so as to cause the desired stream of water to flow. If he desires to have extremely hot and completely treated water, he swings the handle to the left either prior to or after starting the water flow, or he can swing the handle to the right to obtain cold or untreated water. When sufficient water has been drawn, the handle is pushed in and it need not be swung back to the vertical position.

When the valve 62 (Fig. 6) is completely seated so as to cut off the flow of water, the hot water from pipes 26 and 24 quickly drains out. At the same time the water which is being heated at that instant is discharged downwardly through chamber 80 and around the plunger to chamber 20. Under normal circumstances the discharging of this water is very rapid because of the rapid local heating resulting from the stoppage of the water flow. With the plunger seated as shown, the water passes from chamber 80 down past the plunger and through chamber 78, but some of it may also pass to the left along shoulder 74 and through bore 22 to chamber 20. When the plunger is being operated to heat all of the water which passes through the valve, the surfaces 66 and 68 are faced somewhat upwardly; and, if the plunger is then moved to close the valve, the water flows from chamber 80 to the left along surfaces 66 and 68 and thence downwardly through bore 22 to chamber 20. It is thus seen that the water heating or treating chambers are drained rapidly at the end of each heating or treating operation.

In this embodiment the parts which are contacted by the water are made of stainlesss steel and it has been found that there is particular advantage in using this metal for the electrodes as well as for pipe 26 and shell 4. The elements 28 and 30 have been referred to as the electrodes, whereas pipe 26 and shell 4 are, in fact, also electrodes. The cylindrical construction and the insulating collars give sufficient rigidity to prevent warping and the electric current flow as well as the heat are properly distributed.

The rapid draining of the treating unit immediately after the flow has stopped has been found to be very important under circumstances where there might otherwise be accumulations in the vicinity of the electrodes. This rapid draining is facilitated by the tendency for steam to form immediately upon the stoppage of the flow of water. The steam thus formed tends to blow the water downwardly through chamber 8 and also out through a pipe 26. This manner of operation is insured by the arrangement here shown wherein the electrical connections to the electrodes are maintained continuously and the entry of the water into the heating or treating zones causes the electrical flow to start.

While certain of the dimensions of the parts are not critical, it should be pointed out that the unit shown in the drawing has been operated successfully with extremely high efficiency and with dependability. The even spacing of the electrodes is important as is also their shape. In the illustrative embodiment the electrodes are 11 inches long and they are made from a one-half inch standard weight stainless steel pipe cut in half lengthwise. Pipe 26 is 10 inches long and is a one-half inch standard weight pipe while shell 4 is 12 inches long and is of one and one-half inches standard weight pipe.

Under some circumstances the plunger and valve arrangement here shown is omitted and water is directed into the top of the heating or treating unit so that it flows downwardly therethrough. Under such circumstances the center pipe 26 is closed off at the top and a water inlet valve arrangement is substituted for the cap 6. In the illustrative embodiment the voltage source is 220 volts A. C. but the unit, as shown, may be used with a 110 volt source by connecting the electrodes together to the high side of the voltage source and by maintaining the other elements grounded as here shown.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

What is claimed is:

1. In a water treating unit, the combination of, a pair of cylindrical pipes positioned concentrically with an annular zone therebetween, a pair of semi-cylindrical electrodes positioned within said zone concentrically with respect to said pipes, and insulating means separating said electrodes from the adjacent surfaces of said pipes and providing a predetermined flow path for water.

2. A unit as described in claim 1 which includes, a base block providing rigid mountings for said pipes and said electrodes, electrical circuit means providing electrical connections with said electrodes, and water supply means to direct a stream of water through said annular zone.

3. A unit as described in claim 2 which includes, a valve within said base block adapted to be closed to prevent the flow of water into said annular zone, and means providing a discharge at the top of said zone through the smaller of said pipes.

4. A unit as described in claim 3 wherein said valve comprises a plunger having a valve at one end and which is moved axially to increase the rate of water flow, means to divert a variable portion of the water to a discharge opening whereby it does not flow through said annular zone and an operating handle adapted to move said plunger axially and radially.

5. A unit as described in claim 3 which includes, a valve plunger which is cut away at one end to provide a recess of axially increasing cross section, said base block having passageways into which water is directed in accordance with the radial position of said plunger, a handle pivotally attached to the other end of said plunger and having a pivot arm which is positioned within an arcuate groove whereby said handle may be swung to turn said plunger and may be pivotally swung to move said plunger axially.

6. A unit as described in claim 1 wherein there are cylindrical chambers along the inner and outer surfaces of said electrodes, wherein insulating collars are alternately spaced so as to direct the stream of water alternately through portions of said cylindrical chambers.

7. A unit as described in claim 6 which includes, means to drain said annular chamber upon the discontinuance of a flow of water therethrough.

References Cited in the file of this patent

UNITED STATES PATENTS

| Number | Name | Date |
|---|---|---|
| 1,288,774 | Webster | Dec. 24, 1918 |
| 1,738,360 | Davies | Dec. 3, 1929 |
| 1,916,064 | Mortensen | June 27, 1933 |
| 2,398,136 | Drabble et al. | Apr. 9, 1946 |